United States Patent [19]

Malcolm-Brown

[11] Patent Number: 4,931,339

[45] Date of Patent: Jun. 5, 1990

[54] INTUMESCENT SEALS

[75] Inventor: Tessa Malcolm-Brown, Cambridge, England

[73] Assignee: Dixon International Limited, England

[21] Appl. No.: 317,479

[22] PCT Filed: Aug. 20, 1987

[86] PCT No.: PCT/GB87/00585

§ 371 Date: Feb. 13, 1989

§ 102(e) Date: Feb. 13, 1989

[87] PCT Pub. No.: WO88/01335

PCT Pub. Date: Feb. 25, 1988

[30] Foreign Application Priority Data

Aug. 20, 1986 [GB] United Kingdom ................. 8620257
Oct. 17, 1986 [GB] United Kingdom ................. 8624928

[51] Int. Cl.[5] ........................... B32B 1/04; B32B 1/06; B32B 9/00

[52] U.S. Cl. ........................................ 428/71; 428/72; 428/122; 428/188; 428/305.5; 428/319.1; 428/358; 428/921

[58] Field of Search .................... 52/232, 309.4, 309.8, 52/396; 428/31, 71, 72, 83, 122, 188, 305.5, 319.1, 358, 921

[56] References Cited

U.S. PATENT DOCUMENTS 4,581,866 4/1986 Malcolm-Brown .................. 52/232
4,839,223 6/1989 Tschudin-Mahrer ................. 428/57

*Primary Examiner*—William J. Van Balen
*Attorney, Agent, or Firm*—Bucknam and Archer

[57] ABSTRACT

An intumescent seal comprises a first body or mass of intumescent material (3) which provides a hard foam on heating and a second body or mass (4) of intumescent material which produces a soft foam on heating. An intumescent seal comprises at least one body of intumescent material (3) which produces a hard foam on heating and at least one body of intumescent material (4) which produces a soft foam on heating, the intumescent materials (3, 4) being carried by at least one of a pair of members or parts between which gap (24) is defined at least in a predetermined relative position of the two members or parts, the intumescent material being disposed so as to intumesce into the gap (24) on heating at least when the members or parts are in said predetermined position.

28 Claims, 2 Drawing Sheets

INTUMESCENT SEALS

The present invention relates to intumescent seals.

The intumescent seals comprise intumescent material which on being subjected to elevated temperature intumesces (i.e. undergoes substantial expansion) to produce a foam of fire-resistant intumesced material, often referred to as "puff".

Known intumescent seals comprise intumescent material which produces either a hard foam or a soft foam.

By a "hard foam" we mean a foam which, although not necessarily rigid, has a relatively high expansion force i.e. will not deform unless substantial pressure is applied to it. A hard foam acts as a pressure seal.

"Palusol" is an example of an intumescent material based on sodium silicate and which produces on heating, a hard foam. It has been claimed that Palusol is fully intumesced within three minutes of activation.

By a "soft foam" we mean a foam which has a relatively low expansion force. A soft foam acts as a gap-filling foam.

Intumescent materials which produce soft foams on heating are supplied by Sealmaster Limited and are described in British Pat. No. 1,601,131. The soft foam tends to be produced copiously by the intumescent material.

Intumescent materials which produce hard foams and soft foams in general intumesce at similar temperatures on heating. In the event of a fire, where an intumescent material produces a hard foam between a door and its associated frame, the hard foam may exert considerable pressure between the door and the frame, helping to control warping of the door in the early stage of a fire. However, this type of foam, at least when produced from known sodium-silicate based intumescent materials, becomes less and less rigid in performance as the fire progresses and finally becomes relatively soft in practice. A consequence of this is that any further dramatic warping or possibly even minor warping cannot be accommodated. Where the intumescent material produces a gap-filling soft foam, the soft foam is (as compared with a hard foam) less able to accommodate severe early warping although the copious foam produced will readily follow the warped surfaces for a prolonged period e.g. 60–70 minutes.

Accordingly, it will be understood that hard foams may be advantageous in certain situations. E.g. they may be useful to restrain doors from warping under fire conditions. Soft foams may be advantageous in certain other situations. E.g. they may be useful for providing sealing between parts which will inevitably undergo relative movement under fire conditions and may fill irregular gaps better than hard foams.

Hard foams may also be disadvantageous under certain circumstances, e.g. since these are less voluminous than soft foam, and thus may not be sufficiently gap filling where there is warping or where large air gaps are present. Soft foam, equally may be disadvantageous under certain circumstances, e.g. they are insufficiently firm to prevent door warping.

Also some known intumescent materials are subject to atmospheric degradation or exposure to air and in particular on exposure to atmospheric moisture.

The invention aims to provide intumescent seals which combine the advantages of seals which produce hard foam, and of seals which produce soft foam but do not suffer from the disadvantages of either type of seal.

The invention is based on the concept of providing an intumescent seal comprising separate bodies or masses of intumescent material which produces a hard foam on heating and intumescent material which produces a soft foam on heating, the seal being for disposition at or adjacent a gap to be sealed by the foams produced by the intumescent materials under fire conditions.

The intumescent material may be accommodated in at least one holder or may be mounted (without any holder) on or in members or parts which, at least in a predetermined relative position, define the gap.

Such members or parts may be a door or window and an associated fixed frame, the leaves of a pair of double doors or partitions.

In accordance with a broad aspect of the invention, there is provided an intumescent seal comprising at least one holder accommodating intumescent material which produces hard foam and intumescent material which produces soft foam. The holder or each holder may be of aluminium or polyvinylchloride (PVC).

According to a first preferred aspect of the invention, the intumescent seal comprises a holder provided with two grooves, channels, recesses or cavities, one accommodating intumescent material which produces a hard foam and the other accommodating the intumescent material which produces a soft foam.

A draught and smoke sealing blade or other resilient sealing element may be provided between the grooves, channels, recesses or cavities. The resilient sealing element may be secured in the holder or may be provided independently of the holder.

According to a second preferred aspect of the invention, the intumescent seal comprises two holders each having a groove, channel, recess or cavity, the groove, channel, recess or cavity of one holder accommodating intumescent material which produces a hard foam and the groove, channel, recess or cavity of the other holder accommodating intumescent material which produces a soft foam.

The two holders may be secured adjacent to each other on a common member, e.g. a door or door frame or may be secured respectively to two members so as to be at opposite sides of a gap provided between the members and offset from each other at least in a certain condition, e.g. a closed condition, of the members. E.g. one holder may be secured on an edge face (stile) of a door, or in a groove in the edge face, and the other holder may be secured on an opposing face of a door frame, or in a groove in that face.

A draught and smoke sealing blade or other resilient sealing element may be provided between the grooves, channels, recesses or cavities. The sealing element may be carried by one of the holders or may be provided independently of the holders.

According to another preferred aspect of the invention, the intumescent seal comprises at least one body of intumescent material which produces a hard foam and at least one body of intumescent material which produces a soft foam, the intumescent materials being carried by at least one of a pair of members or parts between which a gap is defined at least in a predetermined relative position of the two members or parts, the intumescent material being disposed so as to intumesce into the gap on heating at least when the members or parts are in said predetermined position.

The intumescent materials may be carried by the same member or the intumescent material which produces a hard foam may be carried by one member, the intumescent material which produces soft foam being carried by the other member.

One of the members may carry a resilient sealing element such as a smoke and draught sealing blade.

The two intumecent materials may be accommodated in holders as referred to above in connection with the first and second aspects of the invention or may be accommodated in grooves, channels, recesses or cavities cut in at least one of the members.

The intumescent material may be in the form of strips located in such grooves or channels or may be in the form of plugs located in bores in the members.

Preferably each intumescent material does not intumesce at a temperature below 95° C. but at least begins to intumesce visibly when heated to 160° C.

Preferably the intumescent material which produces the soft foam and, also optionally, the intumescent material which produces the hard foam increase in volume by at least four times, more preferably by at least eight times when they intumesce.

The intumescent material which produces a hard foam may be based on hydrated sodium silicate, unexfoliated vermiculite or expandible graphite.

The intumescent material which produces a soft foam may be based on melamine-formaldeyde resin cross-linked by dicyandiamide or guanidine, ammonium phosphate (e.g. monoammonium phosphate or ammonium polyphosphate) and a polyhydroxy compound. Such intumescent material is disclosed in our British Pat. No. 1,601,131 referred to above.

The invention is further described below by way of example with reference to the accompaning drawings.

In FIGS. 1 to 5 of the drawings, like reference numerals indicate like parts or features.

Figure 1:
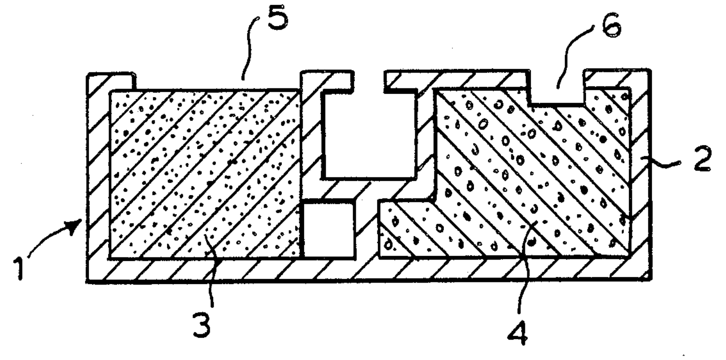
FIG. 1 is a sectional view of a first intumescent seal according to the invention.

Referring to FIG. 1, an intumescent seal 1 comprises an elongate aluminium holder 2 of uniform cross-section.

The holder 2 has two grooves or channels, one filled with intumescent material 3 which on heating produces a hard foam and the other filled with intumescent material 4 which on heating produces a soft foam.

The grooves or channels have respective openings 5 and 6 through which the intumescent materials intumesce on heating and which are spaced apart. The holder has a third, empty groove or channel 8 between the grooves or channels containing the intumescent materials.

Figure 2:
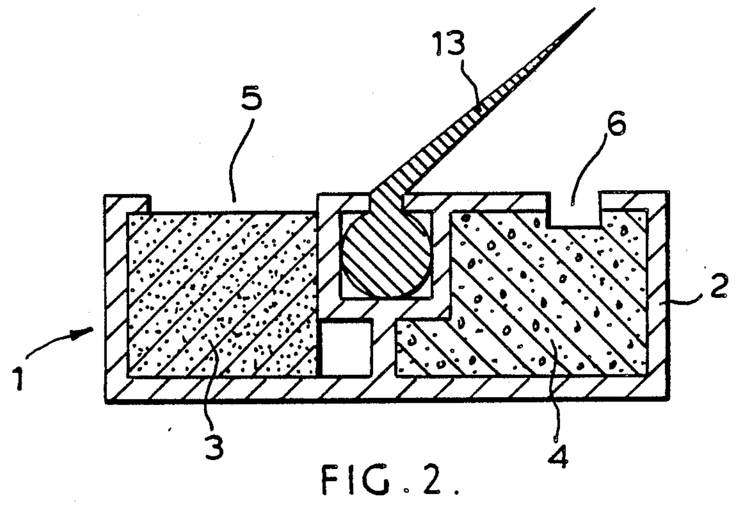
FIG. 2 is a sectional view of a second intumescent seal according to the invention.

Referring to FIG. 2, an intumescent seal similar to that shown in FIG. 1 additionally comprises a resilient member providing a smoke and draught sealing blade 13, a base portion of the resilient member being retained in the third groove or channel of the holder.

Figure 3:
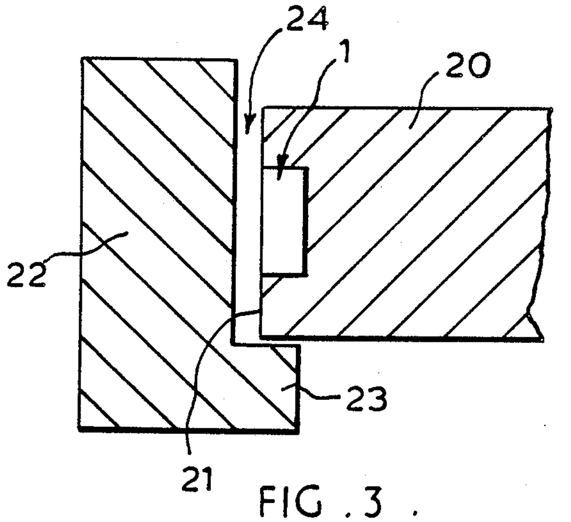
FIG. 3 is a sectional view of part of a door and an associated frame provided with the seal of FIG. 1.

Referring to FIG. 3, a seal 1 as shown in FIG. 1 may be secured in a groove cut into the stile of a door 20.

The door 20 may be conventionally mounted on hinges and in a door frame 22 so that when the door is closed it abuts against an integral stop 23 of the door frame. A gap 24 is defined between the stile of the door and the door frame when the door is closed.

In the event of a fire the gap 24 is sealed by intumescing of the materials 3 and 4 of the seal.

The seal shown in FIG. 2 may be similarly mounted on the stile of a door. In this case when the door is closed, the blade 13 sealingly engages the door frame 22.

Figure 4:
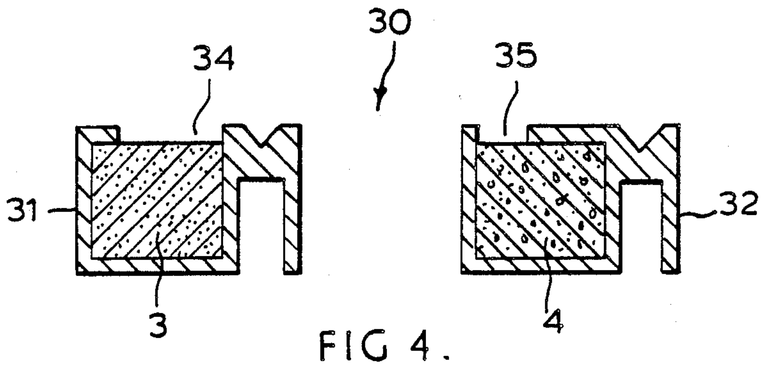
FIG. 4 is a sectional view of the component parts of a third seal according to the invention.

Referring to FIG. 4, a seal comprises two holders 31 and 32 respectively each having a groove or channel. The groove or channel of the holder 32 is filled with intumescent material 3 which on heating produces a hard foam. The groove or channel of the holder 32 is filled with intumescent material 4 which on heating produces a soft foam.

Figure 5:
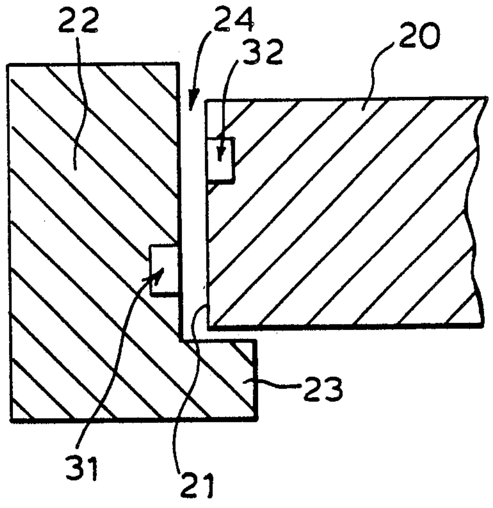
FIG. 5 is a sectional view of a door and its associated door frame provided with the seal of FIG. 4.

The grooves or channels have respective openings 34 and 35 through which the intumescent materials intumesce on heating. The opening 34 is larger than the opening 35 to encourage upwards expansion, through the opening 34, of the hard foam. Referring to FIG. 5, the holders of a seal as shown in FIG. 4, may be secured respectively to a door 20 and its associated door frame 22. The holder 31 is secured in a groove and in the surface of the door frame 22 which faces the stile 21 and the door when the door is closed and the holder 32 is secured in a groove cut in the stile of the door. The openings 34 and 35 face into the gap 24 between the stile of the door and the door frame. The holders 31 and 32 are offset from each other and consequently the hard and soft foams formed on heating do not contact each other at least until heating has been continued for a prolonged period.

If desired both holders 31 and 32 may be secured to the door or both holders may be secured to the door frame.

If desired smoke and draught sealing blades may be provided mounted on the door of the door frame and disposed between the holders, at least when the door is closed.

One of the holders may be provided with a groove (such as shown in FIG. 2) or other means to retain a member providing the smoke and draught sealing blade.

The holders need not have openings for the intumescent materials to intumesce through but may be made of materials such as plastics which melt or soften at elevated temperature thereby allowing the intumescent materials to intumesce substantially unconstrained by the holder.

It is not necessary to provide the intumescent materials in holders. If desired the intumescent materials may be suitably formulated and provided in the form of strips, which may have a water resistant coating, such strips may be secured in grooves cut in the door and/or door frame.

The intumescent seals described above may be mounted on the meeting stiles of the leaves of double doors in a similar manner to that described with reference to a door and its door frame.

More generally, whenever a gap is defined between two members, at least in a certain relative position of the members and it is desired to seal the gap under fire conditions, a seal according to the invention may be provided at the gap and mounted on one or both of the members.

It may be possible to replace the draught and smoke sealing blades referred to above by other resilient draught and smoke sealing elements such as resilient tubular elements.

The holders of the seal may be provided with baffles to hinder tampering as described in our British Pat. No. 1,529,733.

Figure 6:
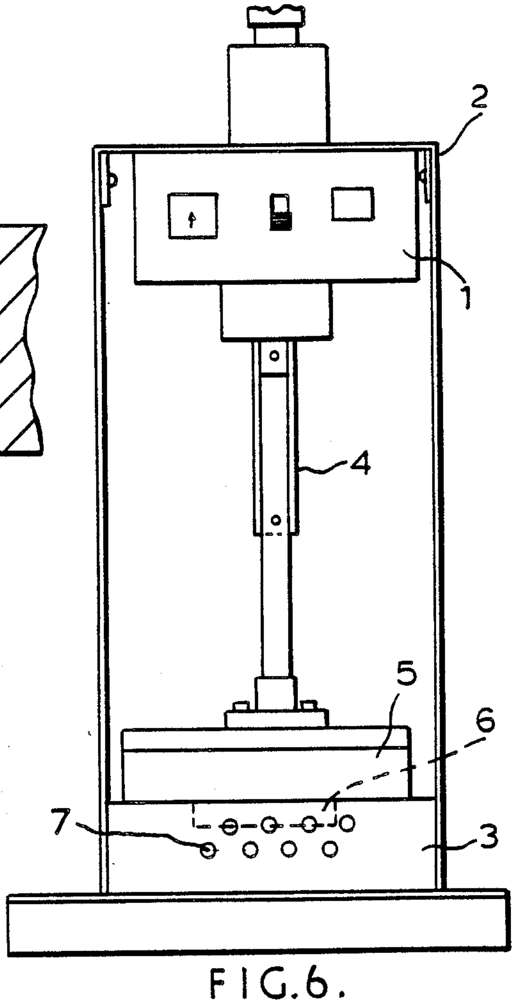
FIG. 6 is a diagrammatic side view of apparatus for measuring expansion force.

The expansion force of the foams referred to herein may be measured by the technique described below with reference to FIG. 6 of the accompanying drawings.

Referring to the drawings, apparatus for measuring expansion force comprises lkN load cell 1 supported in a sheet steel bridge 2 mounted over an electrically heated platen 3. The platen is provided with a pocket 6 for accommodating a specimen or sample comprising intumescent material, the expansion force of which is to be measured. A sliding coupling 4 between a pressure plate 5 above the platen 3 and the load cell allows easy removal of the pressure plate and removal of a specimen or sample from the pocket 6.

The platen 3 accommodates tubular electrical heaters 7.

The pocket 6 has a length of 8 cm, a width of 2.8 cm and a depth of 0.8 cm. Thus the volume of the pocket is 17.9 $cm^3$.

Expansion force of intumescent material is measured by heating the platen up to 700° C. with the specimen or sample comprising the intumescent material in the pocket 6 and with the pressure plate positioned on the platen.

The specimen or sample comprises a hollow prism (e.g. of PVC or aluminium) accommodating the intumescent material and having one or more longitudinal slots through which the material can expand when it intumesces. The holder has a length of 7.5 cm and contains the intumescent material along its entire length.

The body of intumescent material in the holder has an average width of about 8 mm, a thickness of about 6.5 mm, and a cross-section of approximately 0.5 $cm^2$.

A gap of 1 mm is provided between the top of the sample and the pressure plate when the pressure plate is positioned on the platen.

The force exerted on the pressure plate 5 by the intumescent material is measured by the load cell 11.

The expansion force of the intumescent material is expressed as the force (exerted on the pressure plate 5) per unit length of the specimen or sample including the intumescent material.

The expansion forces of the intumescent materials providing the hard and soft foams are preferably as follows:

| | | |
|---|---|---|
| HARD FOAM: | Expansion force | $\geqq 1500\ Nm^{-1}$ |
| | More preferably, expansion force | $\geqq 2000\ Nm^{-1}$ |
| E.g. the expansion force may be 2400 to 2500 $Nm^{-1}$ | | |
| SOFT FOAM: | Expansion force | $\leqq 1000\ Nm^{-1}$ |
| E.g. the expansion force may be 200 to 500 $Nm^{-1}$ | | |

($Nm^{-1}$ means Newtons per meter)

The expansion force of the hard foam is preferably at least 1.5 times, more preferably at least 3 times, and most preferably at least 5 times the expansion force of the soft foam.

The intumescent material used in the present invention and which produces the hard foam may comprise expandible graphite and may be as disclosed in our co-pending British patent applications Nos. 8622341, 8622823 and 8623157. Such intumescent material is multi-directional in action, e.g., when heated to a temperature sufficient to cause it to intumesce it expands in all directions in which it is free to do so. Also intumescent materials comprising expandible graphite and as disclosed in our co-pending applications are resistant to degradation on exposure to the air and in particular on exposure to the atmospheric moisture.

I claim:

1. An intumescent seal comprising a first body or mass of an intumescent material which produces a hard foam on heating and a second body or mass of an intumescent material which produces a soft foam in heating, the intumescent materials being carried by one or more of a plurality of members or parts which at least when they are in a predetermined position relative to each other define a gap, which gap can be sealed by either of the foams produced by the intumescent material under fire conditions, one said body or mass being disposed relatively near one margin of the gap and the other said body or mass being disposed relatively remote from said margin such that the foam produced by said one body or mass separates the other body or mass and the foam produced thereby from said margin.

2. An intumescent seal according to claim 1, wherein there are a pair of said members or parts.

3. An intumescent seal according to claim 1, wherein said members or parts comprise a door or movable window and an associated fixed frame, the leaves of a pair of double doors or windows or movable partitions.

4. An intumescent seal according to claim 1, wherein the two intumescent materials are accommodated in at least one of said parts or members, the two intumescent materials being accommodated separately from each other.

5. An intumescent seal according to claim 4, wherein a draught and smoke sealing blade or other resilient sealing element is provided between the two intumescent materials.

6. An intumescent seal according to claim 1, wherein the seal comprises a holder accommodating both the intumescent materials, the intumescent materials being separate from each other.

7. An intumescent seal according to claim 6, wherein a draught and smoke sealing blade or other resilient sealing element is provided between the two intumescent materials.

8. An intumescent seal according to claim 7, wherein the sealing element is secured in or on the holder.

9. An intumescent seal according to claim 7, wherein the sealing element is provided independently of the holder.

10. An intumescent seal according to claim 1, the seal comprising two holders, one holder accommodating the intumescent material which produces the hard foam and the other holder accommodating the intumescent which produces the soft foam.

11. An intumescent seal according to claim 10, wherein the two holders are secured adjacent each other on a common one of said members or parts.

12. An intumescent seal according to claim 10, wherein the two holders are secured respectively to the two members, on opposite sides of said gap and offset from each other when said members or parts are in said predetermined relative position.

13. An intumescent seal according to claim 10, wherein a draught and smoke sealing blade or other resilient sealing element is provided between the intumescent material producing the hard foam and the intumescent material producing the soft foam.

14. An intumescent seal according to claim 13, wherein the sealing element is carried by one of the holders.

15. An intumescent seal according to claim 13, wherein the sealing element is provided independently of the holders.

16. An intumescent seal comprising a holder accommodating intumescent material which produces a hard foam on heating and intumescent material which produces a soft foam on heating, the intumescent materials being separate from each other, the holder being such that it can be attached to and carried by one of a plurality of members or parts which at least when they are in a predetermined position relative to each other define a gap and such that when the gap is formed the foams produced by both intumescent materials discharge from the holder into the gap when the seal is subjected to fire conditions.

17. An intumescent seal according to claim 16, wherein a draught and smoke sealing blade or other resilient sealing element is provided between the intumescent materials and is secured in or on the holder.

18. An intumescent seal according to claim 1, wherein the intumescent materials are accommodated in grooves or channels in at least one of said members or parts.

19. An intumescent seal according to claim 6, wherein the intumescent materials are accommodated in grooves or channels in the holder or at least one of the holders.

20. An intumscent seal according to claim 18, wherein at least one of the intumescent materials is in the form of a strip accommodated in one of said grooves or channels.

21. An intumescent seal according to claim 1, wherein at least one of the intumescent materials is in the form of plugs located in bores in at least one of said members or parts.

22. An intumescent seal according to claim 1, wherein each intumescent material does not begin to intumesce at a temperature below 95° C. but at least begins to intumesce visibly when heated to 160° C.

23. An intumescent seal according to claim 1, wherein the intumescent material which produces the soft foam increases in volume by at least four times when it intumesces.

24. An intumescent seal according to claim 23, wherein the intumescent material which produces the soft foam increases in volume by at least eight times when it intumesces.

25. An intumescent seal according to claim 1, wherein the intumescent material which produces the hard foam increases in volume by at least four times when it intumesces.

26. An intumescent seal according to claim 25, wherein the intumescent material which produces the hard foam increases in volume by at least eight times when it intumesces.

27. An intumescent seal according to claim 1, wherein the intumescent material which produces the hard foam comprises hydrated sodium silicate, unexfoliated vermiculite or expandible graphite.

28. An intumescent seal according to claim 1, wherein the intumescent material which produces the soft foam comprises cross-linked melamine-formaldehyde resin, an ammonium phosphate and a polyhydroxy compound.

* * * * *